June 2, 1931.  D. S. KENNEDY  1,808,416
TRACTION BELT ATTACHMENT
Filed Dec. 2, 1929
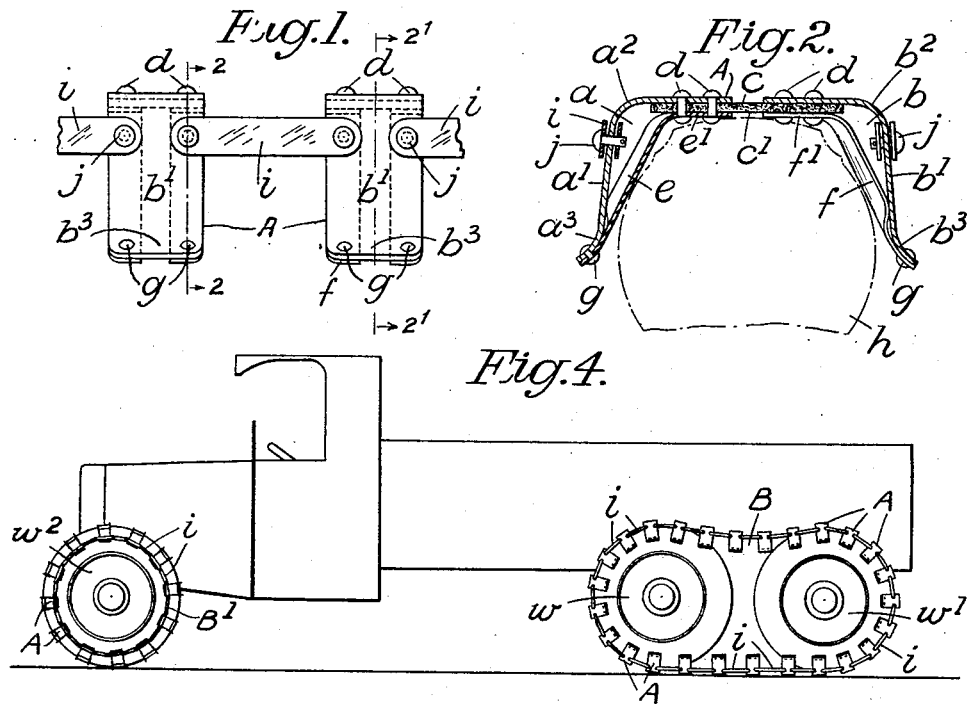
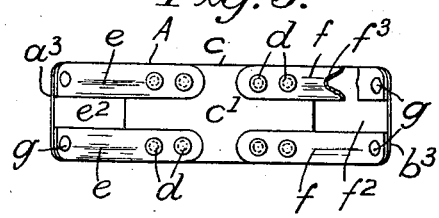

Patented June 2, 1931

1,808,416

UNITED STATES PATENT OFFICE

DONALD STUART KENNEDY, OF ANDOVER, ENGLAND

TRACTION BELT ATTACHMENT

Application filed December 2, 1929, Serial No. 411,115, and in Great Britain March 8, 1929.

This invention relates to traction belt attachments for road vehicle wheels, and has reference more especially to overall attachments which pass around both wheels of a pair arranged in tandem, the attachment forming an endless track which encircles the pair of wheels. The invention is particularly advantageous for use in connection with six-wheeled vehicles fitted with single-tire wheels, but can also be used with twin-tire wheels, and for attachments such as non-skid chains or girdles to be fitted to individual wheels.

The main object of the invention is to provide a traction belt attachment in which each shoe of the endless track or chain is free to bend transversely along or parallel to the longitudinal axis of the belt when in contact with the ground, and about the periphery of the wheel when wrapped around the latter.

A further object is to allow a limited amount of twisting movement of the belt, particularly in the case of an overall attachment when the two wheels are momentarily running in different planes, due to the relative obliquity of the two axles in travelling over uneven ground.

The invention has also for an object to secure better adhesion between the traction belt and the ground, and between the vehicle wheels and the shoes of the traction belt. My improved traction shoe is comparatively inexpensive to make and it has no exposed joints to rust or require lubrication. An overall traction belt made with these shoes can be run slack during operation and it allows for variation of axle or bogie centers.

The invention is hereafter described with reference to the accompanying drawings, in which:—

Figure 1 is a side elevation showing two link-connected shoes of a traction belt attachment.

Figure 2 is a section of which the left half is taken on the line 2—2, and the right half on the line $2^1$—$2^1$ of Figure 1.

Figure 3 is an inner plan of the shoe seen in Figure 2.

Figure 4 shows diagrammatically the fitting of traction belts to a six-wheeled vehicle.

Referring to Figures 1 to 3, each shoe A is composed of two lateral sections $a\ b$ made of mild steel or other suitable rigid material to form wearing surfaces, and a central section $c$ made of flexible material such as multiple-ply balata fabric, the sections being arranged to overlap at their adjacent edges and secured together by means of rivets $d$. The rigid lateral sections $a\ b$ comprise outer members $a^1\ b^1$ of angle shape, with their corners rounded as at $a^2\ b^2$, and having their free ends $a^3\ b^3$ curved slightly outwards. From these curved ends $a^3\ b^3$ there extend diagonal inner members or struts $e\ f$, secured to the said ends by rivets $g$, and also having their adjacent ends $e^1\ f^1$ secured by the rivets $d$ to the inside face $c^1$ of the central section. These inner members $e\ f$ and the central section $c$ form a trough or gutter which approximates the sectional shape of the wheel tire indicated at $h$ in Figure 2, and is capable of flexure about the longitudinal axis of the traction belt.

The inner members $e\ f$ may be formed as separate strips of metal at the front and rear edges of the shoe, leaving gaps between them as seen at $e^2\ f^2$ in Figure 3, to allow the tire to engage partly with the inside face $c^1$ of the central section $c$, according to the curvature of the periphery of the tire. In cross section the inner members may be curved to a convex shape as shown for example at $f^3$ in that figure, so as to avoid chafing the side walls of the tire by sharp edges.

The individual shoes A are connected together in the known manner by means of links $i$ made of mild steel or other suitable material pivoted to the outer members $a^1\ b^1$ of the shoes by pins $j$. The several shoes are thus built up to the required length of traction belt B, which may encircle two wheel-tires $w\ w^1$ as illustrated in Figure 4. It will however be obvious that the shoes may be assembled to form a traction belt $B^1$ suitable for fitting in the manner of a non-skid chain to a single wheel, as indicated by way of example in the case of the front wheel $w^2$ in the same figure.

The composite shoe can conform to the surface of the ground when the wheel rolls over the traction belt in its laid-down position, and can also bend transversely to agree with the sectional shape of the tire when the traction belt is lifted to pass over the wheel, while a limited amount of twist is permitted to the belt in running between two connected wheels.

It will be noted from Fig. 2 of the drawings that the rigid lateral sections have outer members $a^1$ $b^1$ of angular shape and that the rigid links $i$ which space adjacent shoes, are pivotally mounted upon the said lateral sections, said pivotal mountings being arranged intermediately of the depth of such lateral sections and adjacent to the angle of such angularly shaped outer member. The edges of the lateral sections secured to the central flexible section $c$ face one another and the ends $a^3$ $b^3$ of the lateral sections remote from the central flexible section $c$ are with advantage flared outwardly.

I wish it to be understood that the materials and the details of construction mentioned have been given merely by way of example, and that various modifications may be made within the scope of the appended claims.

What I claim is:—

1. In a traction belt attachment for road vehicle wheel and of the kind in which transverse shoes are spaced from adjacent shoes by pivoted connecting links, a composite shoe comprising a central flexible section and two lateral rigid sections, said sections overlapping and being secured together at their adjacent edges, said lateral sections including outer members having means for pivoting the said connecting links thereto, and inner members extending between said outer members and said central flexible section, and said inner members being convex towards the tire on which said shoe engages.

2. In a traction belt attachment for road vehicle wheels and of the kind in which transverse shoes are spaced from adjacent shoes by pivoted connecting links, a composite shoe comprising a central flexible section and two lateral rigid sections, said sections overlapping and being secured together at their adjacent edges, said lateral sections including outer members having means for pivoting the said connecting links thereto, and inner members extending between said outer members and said central flexible section, said inner members being convex towards the tire on which said shoe engages, the ends of said inner and outer members remote from the said central section being secured together and flared outwardly, and said flexible section extending into the space between the other ends of said inner and outer members.

In testimony whereof I have affixed my signature.

DONALD STUART KENNEDY.